3,803,275
PROCESS FOR MAKING AN AMORPHOUS POLY-
ETHYLENE TEREPHTHALATE CONTAINER
William Leonard Corsover, Newark, Del., assignor to
E. I. du Pont de Nemours and Company, Wilmington,
Del.
Original application Mar. 26, 1971, Ser. No. 128,402, now
Patent No. 3,745,150, dated July 10, 1973. Divided
and this application Feb. 2, 1973, Ser. No. 329,155
Int. Cl. B29c 17/07, 25/00
U.S. Cl. 264—28                                2 Claims

ABSTRACT OF THE DISCLOSURE

A method of preparing a container from polyethylene terephthalate having an inherent viscosity of about 0.80 to 1.30. Melt polymer is forced through an annular die to form a tubular slug and the slug is encompassed with a mold maintained at a temperature no greater than about 0° C. The slug is expanded until it conforms to the mold thereby forming the container. The container is quenched against the mold for 10 to 30 seconds, removed from the mold, and post-quenched for at least 30 seconds in a bath maintained at a temperature no greater than about 0° C. The continer is practically amorphous, transparent, glossy, has a shell thickness of about 30 to 90 mols, and has a density of about 1.3362 to 1.3381. Containers formed by this method are useful in packaging foodstuffs and, when in the shape of a bottle, are particularly useful in bottling sodas or beer.

BACKGROUND OF THE INVENTION

This is a division, of application Ser. No. 128,402, filed Mar. 26, 1971, now Pat. No. 3,745,150.

This invention is a process for making a practically amorphous polyethylene terephthalate container particularly useful in food packaging.

Polyethylene terephthalate is a polymer well known for its high strength characteristics. One of its largest areas of use is in film production wherein a large body of technical "know-how" has been accumulated. Films are typically produced by extruding the melt polymer onto a casting wheel and quenching the film until it cools and obtains form stability. It is the nature of the polymer to crystallize as it cools thereby forming a crystalline film. However, it is known that an amorphous film will result by rapidly cooling the film on both sides while it is supported on the casting wheel. Therefore, it can be said that in the art of producing polyethylene terephthalate film, processes are known that result in either a crystalline or amorphous film.

However, in the art of producing shaped articles from polyethylene terephthalate, such as containers, particularly those having a resulting shell thickness up to about 90 mils, it is known and accepted that such articles are crystalline and not amorphous. There are many reasons for this.

First of all, in preparing such shaped articles, it is conventional to heat the polymer to its melt stage, form the article in a mold, then cool the polymer until it retains the shape of the mold. In conventional cooling from the melt stage, it is the nature of the polymer to crystallize. Therefore, obtaining a crystalline article is inherent to the process. Unlike film, in producing such shaped articles, the melt polymer is in a mold and it is not easy or convenient to rapidly quench the polymer properly from both sides to obtain an amorphous polymer.

To elaborate further, film-making can be considered a continuous dynamic process. The film moves over quench rolls where the tension in the film and the amount of wrap on the quench roll ensures optimum contact for cooling. Film thickness, drawdown and stretching also facilitate cooling and thick film, as originally formed, remains in this thick state only a short time. The nature of this typical film-forming process results in virtually simultaneous two-side cooling by combination of quench rolls, air jets mist sprays and electrostatic pinning, all conventional operations.

However, in the art of making thick shaped articles, the article sits in the mold and cools while stationary. In this sense it is not a dynamic, but a static operation. While stationary in the mold, it must cool sufficiently to achieve form stability but it is not being thinned out or drawn down or stretched to a thinner state that would cool more rapidly as can be done in film-making. Rather, it exists in the mold at the same thickness, after being formed, for the entire cooling cycle. This makes it much more difficult to control crystallinity in thick shaped articles than in films. In film preparation, cooling can be provided on either side as long as required by changing the thread-up path and number of quench rolls. The number of quench rolls aids in controlling the crystallinity of the film but does not affect the processing rate of the film. However, the mold set time required for quenching a thick shaped article does effect the processing rate of the articles being formed and this, in turn, does affect the total production cycle time. This illustrates the substantial differences between the process of making a film, particularly an amorphous film, and the problem of trying to make a thick amorphous shaped article.

Secondly, it is generally desirable to have a crystalline article because the crystallinity in the article provides many desirable properties such as strength, gloss and opacity. A typical reflection of the desirability to provide a crystalline article is found in the trade bulletin entitled, "Arnite®" (trademark of Algemene Kunstzijde Unie N.V. AKU-Holland for a thermoplastic polyester based on polyethylene terephthalate) wherein the author states that, "A very important aspect of Arnite® is the process of crystallization. The special properties of Arnite® are only obtained in a well crystallized product . . ."

While crystalline shaped articles are preferred for most uses, they have two disadvantages. First of all, they are rather brittle. This is significant in packaging foods because the articles must be continuously handled and, if dropped, it is desirable to have a container that will not break. Secondly, the crystallized shape is completely opaque. This is significant in food packaging because the contents are masked and not visible. This is generally undesirable.

Since an amorphous article has greater resiliency or toughness compared to crystalline articles, and the articles formed are clear, it is desirable to make a clear amorphous or practically amorphous, i.e., less than about 5% crystallinity, container particularly for use as a food container.

SUMMARY OF THE INVENTION

Accordingly, the present invention provides a process for making a hollow shaped article prepared from polyethylene terephthalate said container having an inherent viscosity of about 0.80 to 1.30 wherein the article is amorphous, transparent, glossy, and has a density of about 1.3362 to 1.3381. Preferably, the hollow article is in the shape of a bottle such as an 8-, 10-, 12-, or 16-ounce soda bottle having a shell thickness of about 30 to 90 mils, and the right cylinder section of the bottle has an axial modulus of elasticity of about $2.0 \times 10^5$ to $3.0 \times 10^5$ p.s.i., a hoop modulus of elasticity of about $1.5 \times 10^5$ to $3.0 \times 10^5$ p.s.i.; and an axial tensile strength at break of about 6.5 to 8.2 k.p.s.i., with a hoop tensile shtrength at break of about 5.5 to 10 k.p.s.i.

The process for preparing the shaped hollow articles of the present invention comprises:

(a) forming a tubular slug from melt polyethylene terephthalate at a temperature of about 265 to 280° C.;
(b) encompassing the slug with a mold that is maintained at a temperature no greater than about 0° C.;
(c) introducing a fluid under pressure into the interior of the slug forcing the slug to expand and conform to the shape of the mold;
(d) quenching the article in the mold by allowing the article to remain in contact with the cold mold for a period of about 10 to 30 seconds;
(e) removing the article from the mold; and
(f) immediately post-quenching the article in a quenching bath maintained at a temperature no greater than about 0° C. for at least 30 seconds.

DSECRIPTION OF THE INVENTION

Polyethylene terephthalate (PET) useful in preparing plastic containers of the present invention has an inherent viscosity of 0.80–1.30 and a melt point temperature in the range of about 255–265° C. The melt processing temperature, however, could be up to about 300° C.

The inherent viscosity is measured at a concentration of 0.5 weight percent polymer solution in a 75/25 weight percent mixture of TFA/CH$_2$Cl$_2$ (trifluoroacetic acid/methylene chloride) at 30° C. The inherent viscosity is measured relative to the solvent above and is expressed as:

$$\text{Inherent viscosity} = \frac{\text{natural logarithm}\left(\frac{\text{viscosity of solution}}{\text{viscosity of solvent}}\right)}{C}$$

where C is the concentration of polymer per 100 milliliters of solution expressed in grams.

Polyethylene terephthalate useful in preparing the thermoplastic articles of this invention includes (a) the usual polymers of commerce wherein at least about 97% of the polymer contains the repeating ethylene terephthalate units of the formula:

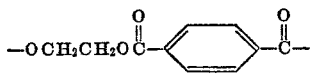

with the remainder being minor amounts of oligomers, diethylene glycol and other ester-forming components formed in the manufacturing process; and (b) copolymers of ethylene terephthalate wherein up to about 10 mole percent of the copolymer is derived from other ester-forming components which are substituted for corresponding amounts of the usual glycol and/or the carboxylic reactants. Other ester-forming components include the monomer units of diethylene glycol; propane-1,3-diol; butane-1,4-diol; polytetramethylene glycol; polyethylene glycol; polypropylene glycol; 1,4-hydroxymethyl-cyclohexane and the like, or isophthalic, bibenzoic; naphthalene 1,4- or 2,6-dicarboxylic, adipic, sebacic acid; decane-1,10-dicarboxylic acid, and the like.

The specific limits on the comonomer are governed by the glass transition temperature of the polymer. It has been found that when the glass transition temperature exends below about 50° C., a copolymer having reduced mechanical properties is obtained, namely a copolymer having a reduced resistance to prolonged stress at temperatures above room temperatures. Accordingly, this corresponds to the incorporation of no more than about 10 mole percent of a comonomer. One exception to this, for example, is the addition of bibenzoic acid where the glass transition temperature of the copolymer remains above 50° C. and does not drop with the addition of more than 10 mole percent. Others would be obvious to those skilled in the art.

In addition, the polyethylene terephthalate polymer can include various additives that do not adversely affect the polymer in use, such as stabilizers, e.g., antioxidants or ultraviolet light screening agents, extrusion aids, additives designed to make the polymer more degradable or combustible, such as oxidation catalysts, as well as dyes or pigments. Mold release agents can also be added, such as glycol or diethylene glycol esters of long chain fatty acids.

Figure 1:
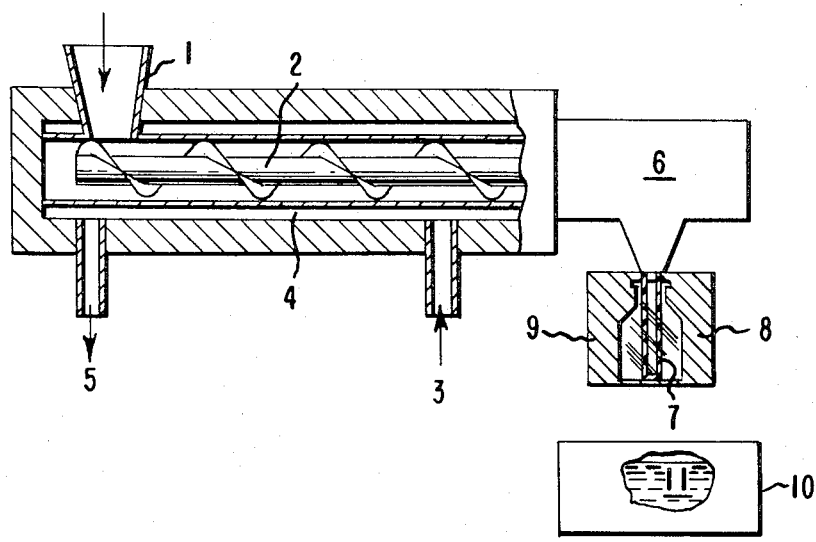
FIG. 1 is a schematic drawing of an apparatus including an extruder, extrusion die, mold and quenching bath useful in making a product and carrying out the process of the present invention.

The plastic container can be prepared by the preferred method to be described below in conjunction with FIG. 1. Referring to FIG. 1, pellets of PET are fed into extruder feed opening 1 into extruder 2. The extruder barrel is heated to a temperature of about 280–300° C. by adding a heating fluid through inlet port 3 through a heating jacket 4 and out through exit port 5. Heating can also be accomplished by the use of electrical heaters. The PET pellets are heated to a temperature slightly above the melting point of the polymer, that is, high enough to melt out crystallization nuclei, and the melt polymer is then extruded through an annular extrusion die 6. The extrusion die forms a hollow cylindrical slug 7 about the length of the container to be formed.

Since it is known that melt degradation can occur when the polymer is heated to its melt temperature and held for an exceedingly long time or when the polymer is exposed to moisture, precautions can be taken to avoid such degradation. Avoidance of degradation helps prevent crystallinity. Precautions include a minimum length of extruder sufficient only to melt the polymer and create a homogeneous mass. In addition, a dry nitrogen blanket can be applied to the feed section of the extruder to eliminate moisture in the polymer and the barrel temperature of the extruder can be maintained at the minimum temperature necessary to melt the polymer.

It is not necessary to start with PET pellets. For example, in an integrated process, melt PET from a polymerization vessel can be forced through a die to form the hollow cylindrical slug.

After slug 7 is formed, mold halves 8 and 9 close around the hollow slug and a fluid, preferably air, is introduced into the interior of the slug forcing the slug to expand and conform to the shape of the mold.

The mold is maintained at a temperature of about −20° to −10° C., quenching the outside surface of the molded article, i.e., a bottle. The bottle remains in the mold for 20 to 25 seconds, a time sufficient for the melt polymer to obtain form stability, and for the outside surface of the bottle to quench to an amorphous state. Longer set times without inside cooling will result in crystallization of the inside surfaces of the container and this is undesirable in the present invention.

Thereafter, the mold halves are separated, the bottle removed and immediately post-quenched in a quenching bath 10 at a temperature of about −20 to −10° C. for at least 30 seconds. The quenching bath solution 11 can be a solution of methanol and water. Quenching in a liquid bath is important because it provides a rapid and convenient method of quenching the inside surfaces of the bottle.

Figure 2:
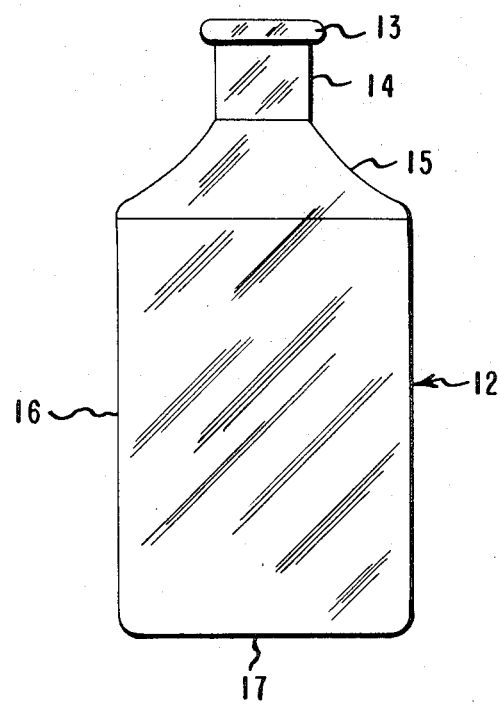
FIG. 2 is a typical container, i.e., a bottle made according to the present invention.

The bottle 12 formed according this procedure is shown in FIG. 2 having a lip section 13 that can be used for capping, a neck section 14, a shoulder section 15, a cylindrical section 16 and a bottom section 17 which can be shaped for maximum stability against eversion or tipping by simply shaping the mold accordingly.

The plastic containers of this invention are practically amorphous, i.e., less than 5% crystallinity, transparent, glossy, have a density of about 1.3362 to 1.3381, and a shell thickness of about 30 to 90 mils. Preferably, the containers are in the shape of a bottle, such as an 8-, 10-, 12-, 16-, or 32-ounce soda bottle, wherein the right cylinder section of the bottles has (a) a modulus of elasticity in the axial direction of about $2.0 \times 10^5$ to $3.0 \times 10^5$ p.s.i. and in the hoop direction of about $1.5 \times 10^5$ to $3.0 \times 10^5$ p.s.i.; and (b) a tensile strength at break in the axial direction of 6.5 to 8.2 k.p.s.i. and in the hoop direction of about 5.5 to 10 k.p.s.i.

Although the preferred embodiment, the plastic container as illustrated in FIG. 2, is in the shape of a bottle, it can be appreciated that various molds can be used to obtain containers having various sizes and shapes functionally suitable or aesthetically designed for various needs.

In the shape of a bottle, the containers of the invention can be used to bottle soda, beer, fruit juices, or other beverages for human consumption. In the shape of a jar, these containers can be used to jar pickles, jelly, peanut butter, and other foodstuffs.

The present invention will be illustrated by the following examples. All parts, percentages, and proportions are by weight unless otherwise indicated.

The following tests are used to characterize the containers of the present invention.

Density.—ASTM Designation: D1505–63T entitled, "Density of Plastics by the Density Gradient Technique." This method is based on observing the level to which a test specimen sinks in a liquid column exhibiting a density gradient, in comparison with standards of known density. The density is the weight per unit volume of material at 23° C.

Drop test.—A bottle is filled with water, capped, and dropped on a concrete floor from various heights with the bottle landing on the edge of the bottom. After each drop, the bottle is inspected to determine whether cracking occurred.

Internal static pressure test.—A bottle is filled with water, equilibrated to room temperature; then the bottle is pressurized until it fails by cracking, causing a loss in pressure and fluid.

Tensile, properties.—Determined by ASTM-D-882 method of testing wherein a specimen two inches long and one-eighth inch wide is removed from the right cylinder section of a bottle and stretched at a rate of about 100% per minute to determine:

(a) tensile yield stress—the force per unit of original cross-sectional area required to stretch the specimen until the specimen begins to stretch without an increase in load;
(b) tensile stress at break—the force per unit of original cross-sectional area required to stretch the specimen until it breaks;
(c) modulus of elasticity—the ratio of stress (tensile load per unit of initial cross section) to strain (the change in original length of the specimen); and
(d) elongation—the extension between bench marks on a specimen produced by a tensile force applied until the specimen breaks, expressed as a percentage of the original distance between the marks.

EXAMPLE 1

An Impco screw injection blow molding machine Model No. B–13S–R17 was used under the following conditions:

Rear screw section temp.: 280° C.
Front screw section temp.: 270° C.
Die: 275° C.
Mold setting: 24 seconds
Air pressure: 100 p.s.i.
Mold coolant: Tap water, methanol/water mixture at −20° C.

PET pellets having an inherent viscosity of about 1.1 were fed into the extruder, melted, and extruded as a hollow slug into a bottle-shaped mold. The hollow, shaped slug was blown with compressed air by conventional means and remained in the mold for a period of about 20 seconds. Thereafter, the mold was opened and the bottle immediately submerged in tap water. Twenty-five bottles were prepared by this process and bottle samples showed the following:

(a) X-ray analysis indicated no crystallinity and no orientation;
(b) the bottles had an inherent viscosity of about .75; and
(c) the water-filled bottles resisted fractures when thrown against a concrete floor or when dropped from heights as high as 15 feet.

In addition, each bottle was dropped many times in succession and still showed no signs of fracture.

EXAMPLES 2–30

Bottles are made in the same manner as that described in Example 1, each bottle having a capacity of one-third of a liter and a shape like a bottle shown in FIG. 2. Following are data collected from various tests run on the bottles:

EXAMPLES 2–10

| Example Number | Density (g./cm.³) | Crystallinity (percent) | Modulus of elasticity (10⁵ p.s.i.) | | Tensile yield stress (k.p.s.i.) | | Tensile stress at break (k.p.s.i.) | | Elongation (percent) | |
|---|---|---|---|---|---|---|---|---|---|---|
| | | | Axial direction | Hoop direction | Axial direction | Hoop direction | Axial direction | Hoop direction | Axial direction | Hoop direction |
| 2 | 1.3378 | 3.85 | 2.5 | 2.3 | 5.6 | 5.2 | 7.7 | 5.9 | 350 | 320 |
| 3 | 1.3381 | 4.10 | 2.4 | 2.0 | 4.9 | 5.1 | 7.6 | 6.6 | 340 | 340 |
| 4 | 1.3368 | 3.05 | 2.2 | 2.1 | 4.8 | 5.3 | 6.9 | 7.3 | 340 | 380 |
| 5 | 1.3362 | 2.55 | 2.2 | 2.6 | 5.1 | 6.5 | 7.4 | 9.4 | 370 | 360 |
| 6 | 1.3362 | 2.55 | 2.8 | 2.7 | 6.0 | 6.9 | 7.5 | 8.1 | 340 | 370 |
| 7 | 1.3363 | 2.65 | 2.5 | 2.1 | 5.1 | 5.4 | 8.1 | 7.2 | 380 | 350 |
| 8 | 1.3362 | 2.55 | 2.4 | 1.9 | 5.3 | 4.7 | 6.7 | 8.3 | 340 | 360 |
| 9 | 1.3362 | 2.55 | 2.5 | 2.9 | 6.2 | 7.9 | 7.9 | 9.8 | 330 | 380 |
| 10 | 1.3366 | 2.90 | 2.4 | 2.4 | 5.7 | 6.2 | 8.0 | 8.0 | 360 | 380 |

EXAMPLES 11–20

| Example Number | Weight (g.) | Sidewall average thickness (mils) | Pressure at break (p.s.i.g.) |
|---|---|---|---|
| 11 | 57.2 | 49 | 165 |
| 12 | 47.4 | 43 | 120 |
| 13 | 63.6 | 47 | 225 |
| 14 | 62.6 | 46 | 190 |
| 15 | 38.6 | 32 | 115 |
| 16 | 37.7 | 33 | 100 |
| 17 | 61.2 | 52 | 145 |
| 18 | 61.7 | 50 | 190 |
| 19 | 35.4 | 35 | 75 |
| 20 | 58.1 | 50 | 210 |

EXAMPLES 21-30

| Example Number | Weight (g.) | Height of drop (feet) | | |
|---|---|---|---|---|
| | | 2 | 4 | 6 |
| 21 | 39.0 | P | P | C |
| 22 | 43.3 | P | P | P |
| 23 | 59.4 | P | P | P |
| 24 | 65.2 | P | C | |
| 25 | 46.3 | P | P | P |
| 26 | 37.4 | P | P | C |
| 27 | 45.3 | P | P | C |
| 28 | 62.2 | P | C | |
| 29 | 51.2 | P | P | C |
| 30 | 60.7 | P | C | |
| No. passed/total | | 10/10 | 7/10 | 3/10 |

NOTE.—P=Passed; C=Cracked.

EXAMPLES 31-38

Bottles are made in the same manner as that described in Example 1 except that the capacity of each bottle is 4 ounces. The sidewall of each bottle is tested for inherent viscosity. Inherent viscosity is measured in a 75/25 mixture of TFA/$CH_2Cl_2$ at 30° C. The following results are obtained:

| Ex. No. | Inherent viscosity |
|---|---|
| 31 | 0.80 |
| 32 | 0.82 |
| 33 | 0.90 |
| 34 | 0.89 |
| 35 | 0.87 |
| 36 | 0.89 |
| 37 | 0.87 |
| 38 | 0.84 |

What is claimed is:
1. A process of preparing a container comprising:
   (a) forming a tubular slug from melt polyethylene terephthalate having an inherent viscosity of about 0.80 to 1.30 at a temperature of about 265 to 280° C;
   (b) encompassing the slug with a mold that is maintained at a temperature no greater than about 0° C.;
   (c) introducing a fluid under pressure into the interior of the slug forcing the slug to expand and conform to the shape of the mold;
   (d) quenching the article in the mold by allowing the article to remain in contact with the cold mold for a period of about 10 to 30 seconds;
   (e) removing the article from the mold; and
   (f) immediately post-quenching the article in a quenching bath maintained at a temperature no greater than about 0° C. for at least 30 seconds.
2. The process of claim 1 in which the mold is maintained at a temperature of about −20 to −10° C., the article is quenched in the mold for about 20 to 25 seconds and the article is post-quenched at a temperature of about −20 to −10° C. for at least about 60 seconds.

References Cited
UNITED STATES PATENTS

| 2,878,154 | 3/1959 | Cheney et al. | 264—28 X |
| 3,429,854 | 2/1969 | Siggel et al. | 264—92 X |
| 3,733,309 | 5/1973 | Wyeth et al. | 264—98 X |

ROBERT F. WHITE, Primary Examiner

J. H. SILBAUGH, Assistant Examiner

U.S. Cl. X.R.

264—98, 425—DIG. 208